*INVENTOR.*
ALEXANDER SILVER

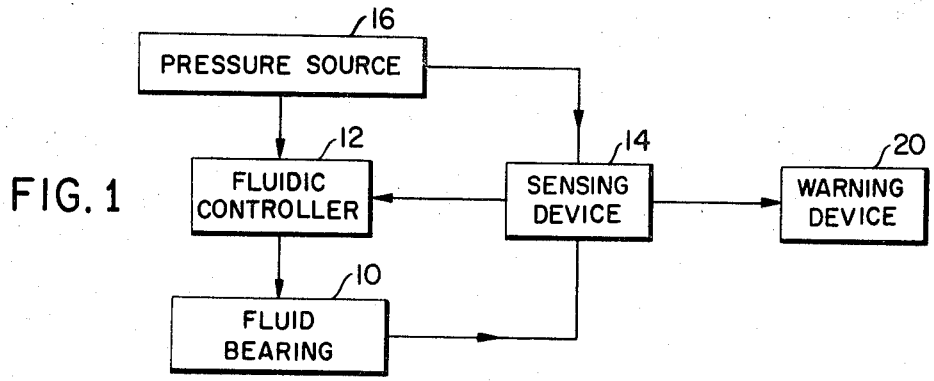
FIG. 1
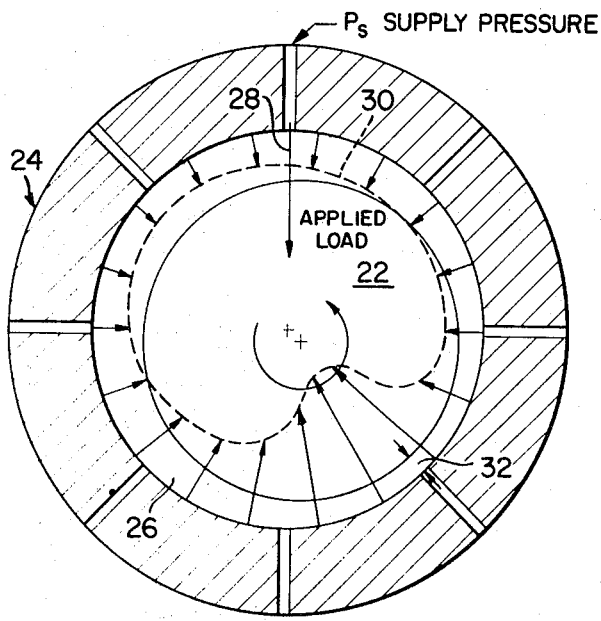
FIG. 2
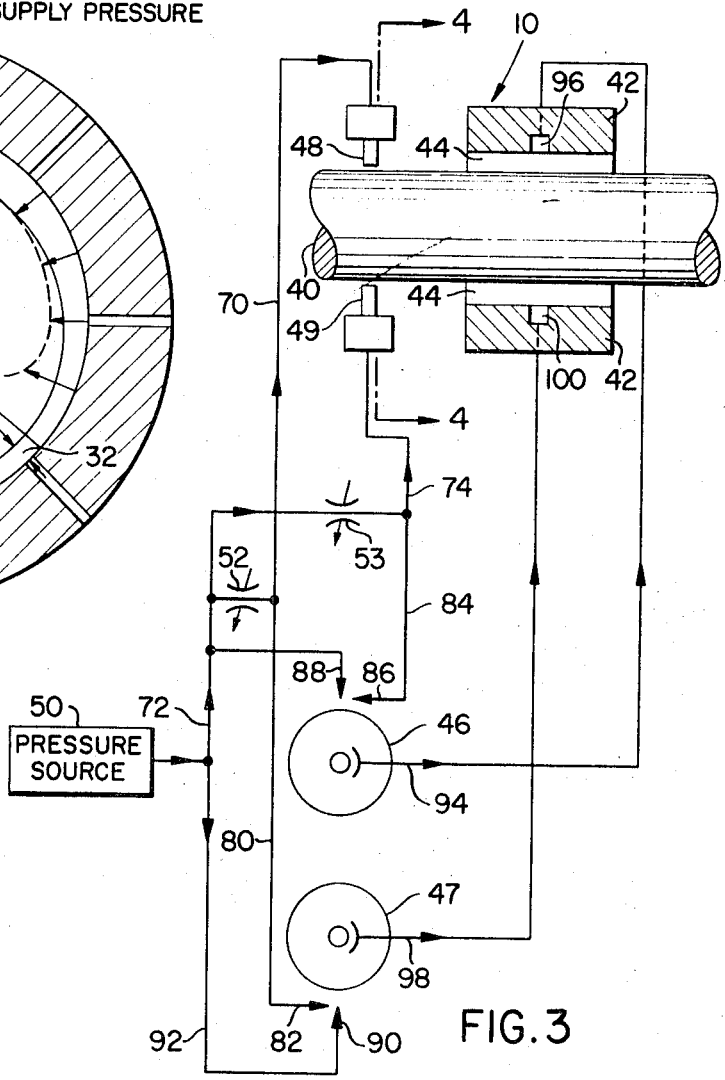
FIG. 3
FIG. 4

BY
ATTORNEYS

_United States Patent Office_

3,560,064
Patented Feb. 2, 1971

3,560,064
SERVO CONTROLLED FLUID BEARING
Alexander Silver, Tarzana, Calif., assignor to The Garrett Corporation, a corporation of California
Filed Jan. 3, 1969, Ser. No. 788,881
Int. Cl. F16c 1/24
U.S. Cl. 308—122                                    13 Claims

ABSTRACT OF THE DISCLOSURE

A servo controlled fluid bearing arrangement is disclosed with a journal type bearing being illustrated. The servo device, for example a vortex amplifier or a fluid amplifier, communicates with a pressure source and the spacing between the shaft and the bushing of the bearing. Eccentric rotation of the shaft activates the device to selectively increase and decrease pressure within the spacing to counteract shaft displacement.

---

This invention relates to a servo-controlled fluid bearing and more particular to a fluid bearing having a fluidic device for selectively controlling fluid pressures within the bearing in response to detected deviation from stable pressures.

BACKGROUND OF THE INVENTION

Fluid bearings are well known in the art and may be generally categorized as liquid or gas bearings. The gas bearing has several important advantages which distinguish it in degree from liquid bearings and in kind from all other types of bearings. One advantage of a gas bearing is its operation over a wide temperature range. A second advantage of a gas bearing is a very low friction because of the inherently lower viscosity of gas. Externally pressurized gas bearings are capable of handling high loads and exhibit extremely low friction torque, while permitting very high speed operation.

Fluid bearings are used in numerous applications but must meet the most rigorous requirements in the aircraft industry because of the range of environmental conditions. Also, for applications within an aircraft size and weight are extremely important, as in aircraft air conditioning compressors. Higher compressor efficiency is achieved at higher speeds, and the higher the efficiency, the smaller (physically) the compressor. Rotational speeds for fluid bearings may vary from a few thousand r.p.m. to several hundred thousand r.p.m. It is to be clearly understood that actual contact between the movable and stationary elements of a bearing is intolerable, particularly at extremely high rotational speeds, as physical contact places the bearing in a failure mode. Hence, in designing fluid bearings, prevention of bearing element contact is a prime design consideration.

Because of the nature of fluid bearings, they inherently require close tolerances between the movable and the stationary elements so that a large pressure may be achieved while still maintaining fluid consumption at a reasonable minimum. Theoretically, when considering a fluid bearing of the journal type having a shaft rotating in a bushing or housing, the center of the shaft and the center of the bushing are coincident during rotation. However, when the shaft is under load, the center of the shaft tends to be displaced from the center of the bushing and, during rotation, the center of the shaft usually orbits about the center of the bushing in a predetermined eccentricity. Control of this eccentricity is of prime concern. Considering the need for close tolerances and the phenomenon of shaft eccentricity, control of the rotating shaft must be precise to prevent shaft-bushing contact and thereby failure of the bearing.

While shaft eccentricity can be calculated theoretically, other variables are present which are difficult to consider theoretically but which must be carefully controlled. Over a wide range of speeds, the fluid bearing has an extremely low level of vibration, but there are critical speeds at which large amplitude "whirl" develops. "Whirl" can be defined as the relative orbital motion between the axis of rotation of the shaft and the axis of the bushing. Synchronous whirl may be excited by shaft unbalance and occur at relatively low critical speeds or resonances. Half-speed whirl results from action of the rotating fluid film and may occur at harmonics of the first critical speed. Relative to other types of bearings, whirl occurs at relatively low speeds in a fluid bearing because one of the factors controlling the eccentricity amplitude is the damping ability of the medium between the movable elements. When comparing the damping ability of a fluid film to a metal-to-metal separation such as in a roller bearing, it can be appreciated why whirl is of much more concern when dealing with fluid bearings. And again the distinction between a gas and a liquid bearing may be made when liquid is considered to be relatively incompressible. Fluid bearings must therefore be designed so that either the critical speeds lie beyond the operating speed range of the machine or the bearing must be able to run through the critical speeds without damage. This is generally true of externally pressurized bearings as well, even though certain of the stability problems just described are more prominent in hydrodynamic, or self-pressurized, fluid bearings.

It is, therefore, a general object of the present invention to provide an improved fluid bearings.

It is another object of the present invention to compensate automatically for eccentricities of the rotatable element in a bearing.

Another object of the present invention is to provide a fluid bearing arrangement having a servo control of shaft position which is responsive to position deviations.

Still another object of the present invention is to provide a fluid bearing arrangement having an automatic compensation for bearing rotational instabilities.

SUMMARY OF THE INVENTION

In order to overcome the problems mentioned above, the present invention provides a fluidic controlled fluid bearing comprising a fluid bearing having first and second elements movable relative to one another and a controlled spacing between the two for receiving a fluid under pressure. A fluidic controller communicates with the spacing and with a fluid pressure source for altering the pressure of the fluid in the fluid space. As a decrease of pressure is detected in one portion of the bearing fluid space, resulting signal, amplified by a suitable pressure device, is used to cause additional fluid to be directed thereto from the fluid pressure source. Thus the bearing compensates for bearing load, shaft eccentricity and the like.

As utilized in the context of a journal bearing, particular arrangements in accordance with the invention may employ a plurality of fluidic pressure sensors spaced circumferentially about the shaft and arranged to detect relative shaft position. Each sensor communicates with a corresponding fluid flow device to control the fluid to, and therefore the pressure at, a related segment of the fluid bearing. Thus as the shaft position deviates in a particular direction, the sensor which is arranged to detect that deviation causes the corresponding fluid flow device to direct more fluid to the segment of the bearing toward which the shaft deviation occurs. At the same time, the sensor at the opposite side of the shaft experiences a deviation away from that side and causes the corresponding fluid flow device to restrict the fluid flow to a related region of the bearing. Together, these two actions oppose the instantaneous eccentric motion of the shaft and tend to restore it to its central position and maintain it there.

In accordance with the invention, the sensing elements may be of any suitable type, electrical, pneumatic, hydraulic, or even mechanical if desired. However, in preferred embodiments of the invention, fluidic pressure sensors are employed which are connected to the same fluid pressure source that is utilized to maintain the shaft properly positioned within the bearing.

In one particular arrangement in accordance with the invention, fluid amplifier devices are utilized as the control elements for the flow of pressurized fluid to the bearing. Such devices utilize a jet flow through the amplifier with a structural arrangement for permitting a lower pressure control jet to trigger the shifting of the major jet from one outlet passage to another. Various types of triggering structures may be utilized for the control function within such a fluid amplifier device.

In another particular arrangement in accordance with the invention, vortex amplifiers are utilized as the devices for controlling the fluid flow to various segments of the bearing. Such devices are generally preferable for use in arrangements of the present invention because their configuration permits a continuously variable control of fluid output, whereas the so-called fluid amplifier devices are principally on-off elements which either provide full output or none.

Although the invention as thus described is of use principally in controlling the instantaneous pressures at various segments of a pressurized fluid bearing, arrangements in accordance with the invention are capable of performing an additional function of a type which is becoming increasingly important as refinements in machinery bearings are developed and as machines are subjected to increasing load and speed requirements. One of the problems which has always been present in rotating machinery is that of predicting when a machine is likely to break down because of bearing failure. Heretofore, only the crudest of methods have been developed, relying principally on a monitoring of deteriorating bearing particles in the lubricating fluid or the deterioration of the fluid itself, the requirement for overhaul and inspection if certain overloads are encountered, and routine inspection at periodic intervals. However, none of these methods are actually related to the impending failure of a bearing in any way that can lead to actual prediction of failure.

Pressurized bearing and servo control arrangements in accordance with the present invention lend themselves readily to a system for detecting the imminent failure of the bearing. This is by making use of what is actually a continuous monitoring of instantaneous pressures within various segments of the bearing to provide a warning in the event that the pressure at a given point exceeds some predetermined value, which is related to a shaft deviation indicative of imminent bearing failure. Therefore, in accordance with an aspect of the invention, one particular arrangement thereof is provided with a warning device coupled to the bearing pressure control system. The warning device may be provided with a threshold detector which activates the device only in the event that shaft deviation in excess of some predetermined maximum safe limit occurs.

BRIEF DESCRIPTION OF THE DRAWINGS

A better understanding of the invention may be had from a consideration of the following detailed description, taken in conjunction with the accompanying drawings, in which:

FIG. 1 is a block diagram representing one particular arrangement in accordance with the invention;

FIG. 2 is a diagrammatic view in section showing the force vectors within a journal bearing arranged for use in the present invention, viewed in a direction along a shaft;

FIG. 3 is a schematic diagram of a preferred embodiment of the invention illustrating a journal type bearing having vortex amplifiers as fluidic controllers;

FIG. 4 is a section view of a sensing device taken along line 4—4 of FIG. 3;

DESCRIPTION OF THE PREFERRED EMBODIMENT

Figure 5:
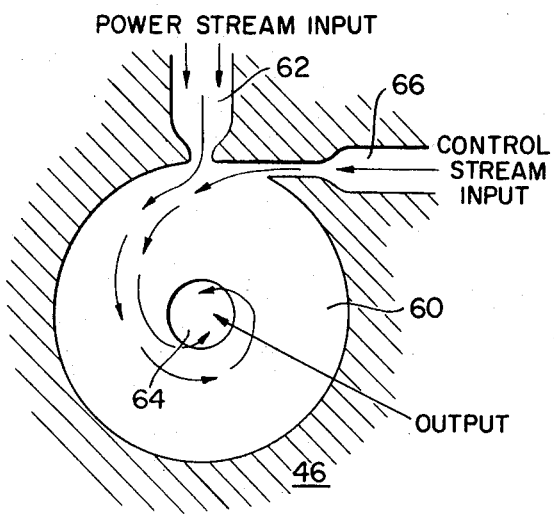
FIG. 5 is a sectional diagram of a vortex amplifier which may be used as the fluidic controller in the invention as represented in FIG. 1.

Referring now to the drawings where like numerals designate like or corresponding parts throughout the several views, there is illustrated in FIG. 1 in block diagram form a fluid bearing 10, fluidic controller 12 and a sensing device 14. Additionally, a pressurized fluid source 16, and a warning device 20 are illustrated and will be more fully described hereinafter. Pressure from the source 16 to the bearing 10 is controlled by the controller 12 in response to servo loop signals from the sensing device 14 which is coupled to detect pressure variations in the bearing 10.

FIG. 2 illustrates the pressure profile versus attitude angle for an externally pressurized journal type bearing with a unidirectional load. In FIG. 2 the bearing is shown having a rotating element, such as the shaft 22, within a stationary element, such as the bushing 24, and having a spacing between the bushing and the shaft designated 26. Ideally, under no-load conditions, the center of the bushing coincides with the center of the rotating shaft so that the spacing 26 forms an annular ring of uniform width. However, when the shaft 22 is under an applied load as depicted by an arrow designated 28, the center of the shaft is somewhat displaced from the center of the bushing and, when rotating, orbits around the center of the bushing in the direction of shaft rotation. This occurs because, according to lubrication theory, a rotating shaft displaced from the center of the bushing creates a restoring force having a resultant acting at an angle to the applied load and not along a directional path through the center of the bushing. This phenomenon is illustrated in FIG. 2 by a pressure profile shown in dotted line designated 30 which depicts the magnitude and location of restoring forces in response to the applied load 28. As can be seen, the result of the restoring force is located in the fourth quadrant acting in a direction generally toward the center of the bushing but displaced slightly to the right (when the shaft rotation is counterclockwise). This demonstrates a shift of the direction of the restoring force in response to the applied load 28 due to the rotation of the shaft within the bearing. This shift of force direction contributes to the bearing instability and brings into play in a hydrostatic bearing configuration certain of the factors that contribute to the inherent instabilities of a hydrodynamic bearing. This shift of phase with respect to the shaft displacement and restoring forces in a hydrostatic bearing may be compensated for in particular arrangements in accordance with the present invention by means which will be specifically discussed hereinafter in connection with the particular structures involved.

In hydrostatic bearings, certain of the problems relating thereto arise from the fact that certain minimum clearances between the shaft and bushing are necessary for the proper operation of the bearing, specifically to accommodate normal orbital eccentricities, and yet when the shaft is displaced, as under load, there is an excessive flow of the pressurized fluid through the region from which the shaft is displaced. This excessive flow of the pressurized fluid imposes an undesirable demand upon the pressure source, and may in certain circumstances even drag down the pressure which is available for providing the fluid which develops the restoring force on the side of the shaft toward which displacement has occurred. This action undesirably limits the restoring force and causes the bearing to exhibit insufficient damping against shaft deviations. While attempts have been made to counteract this effect by employing flow restrictions in the various chambers through which the pressurized fluid is channeled to the bearing area, even to the extent of equipping such flow restrictions with mechanical dampers in certain cases, these arrangements have not been fully effective. By contrast, a particular benefit from the practice of the present invention, as represented in FIG. 1 for example, derives from the effect of throttling back the pressure and flow through the channels where the pressurized fluid is not needed, while at the same time added flow at full pressure is applied to maintain support in the particular region where it is needed in the bearing. It will be understood that arrangements in accordance with the present invention advantageously permit the separation of the restoring force which is developed from the actual displacement of the bearing elements. Particular devices such as vortex amplifiers may be employed as the fluidic controller element 12 in the system of FIG. 1 to provide actual gain in the loop between the pressure source and fluid bearing. Thus, a suitable restoring force may be developed for a very limited displacement of the bearing element. Moreover, the phase relationship between the sensing device 14 and a fluidic controller 12 of FIG. 1 may be adjusted as desirable for the operating conditions of the fluid bearing and its control system. Thus, for example, this relationship may if desired be made to be variable with operating speed of the bearing.

Referring now to FIG. 3, there is shown a preferred embodiment of the present invention wherein the bearing 10 is again of a journal type comprising a shaft 40 rotatable within a bushing 42 and having an annular spacing 44 therebetween. The fluidic controller 12 (FIG. 1) for the bearing 10 is exemplified in FIG. 3 by two vortex amplifiers 46 and 47 while the sensing device 14 (FIG. 1) is exemplified by bleeder jets 48 and 49. The pressure source 16 (FIG. 1) is exemplified by the pressure source 50, and additionally FIG. 3 illustrates variable restrictive orifices 52 and 53 and various conduits for fluid and signal transmission between the various named elements.

Before proceeding with the operation of the FIG. 3 embodiment, reference is made to FIG. 5 which illustrates in more detail the operation and underlying theory of a vortex amplifier or modulator. The vortex amplifier is a fluidic device with virtually complete power flow cut-off capability which may be accomplished in a gradual and continuous manner. The vortex amplifier 46 of FIG. 5 comprises an annular chamber 60 having a power input conduit 62, a power output opening 64 and a control input conduit 66. When a fluid flow is introduced into the power input conduit 62 in the absence of any fluid flow through control input conduit 66, the power flow will encounter little impedance before exiting through the output opening 64. However, if a fluid flow is also introduced through the control input conduit 66, a vortex is formed in the chamber 60 because the control fluid flow is injected tangentially to the annular chamber. The power input flow no longer follows a radial path from the input conduit 62 to the output opening 64, but rather is caught by the vortex and forced to spiral inward toward the output. As the flow spirals closer to the output, the radius of the rotating fluid decreases while the tangential velocity increases because of conservation of angular momentum. Resulting sheer stresses in the rotating fluid lead to a pressure drop and increased flow impedance as the fluid spirals toward the output. The increased impedance reduces the pressure or force of the output flow. Thus the greater the control input flow, the less will be the pressure at the output. The vortex amplifier 46 can be designed so that the control input flow nearly completely throttles the power input flow.

Referring again to FIG. 3, bleeder jets 48 and 49 disposed about the rotating shaft are shown connected respectively through the variable throttling valves 52 and 53 to the pressure source 50 by respective conduit networks, 70, 74 and 72 as shown. Additionally, bleeder jet 48 is connected by conduits 70 and 80 to the control input conduit 82 of vortex amplifier 47 while bleeder jet 49 is connected by conduits 74 and 84 to the control input conduit 86 of vortex amplifier 46. The power input conduit 88 of vortex amplifier 46 is connected directly to the pressure source 50 by conduit 72 while power input conduit 90 of vortex amplifier 47 is connected to the pressure source 50 by conduit 92. The output conduit 94 of the vortex amplifier 46 is connected to a pressure-flow outlet 96 located within the bushing 42 and opening to the spacing 44 while the output conduit 98 of vortex amplifier 47 is connected to a pressure outlet 100 located in the bushing 42 and opening to the spacing 44 but oppositely disposed from the pressure outlet 96. Additional elements (not shown) may be oriented about the shaft 40 for control of shaft displacement along other radii.

In operation, if the eccentrically rotating shaft 40 should move downward to approach the pressure outlet 100 and the sensing bleeder jet 49, the pressure within conduit 74 increases toward the level of the pressure source 50 so that the flow coming from the pressure source through conduit 72 is diverted from conduit 74 through conduit 84 toward the control input circuit 86 of vortex amplifier 46. Thus a power input flow through input 88 from the source 50 will be in interference with a control input flow from conduit 86. The resulting pressure of the flow through the outlet 94 is reduced, thereby reducing the pressure at pressure outlet 96 and limiting the flow therethrough. At the same time the spacing between bleeder jet 48 and the shaft increases so that there is a reduced pressure at the outlet of the bleeder jet 48 and in the conduit 70 connected thereto. The pressure in conduit 80 also reduces and results in a reduced control pressure at the control input conduit 82 of the vortex amplifier 47. Since there is now less interference with the power input through power input 90, the pressure output of the vortex amplifier 47 through the output conduit 98 is increased, thereby increasing the pressure at the pressure outlet 100. Thus, it is seen that a shaft movement toward the bleeder jet 49 and the pressure outlet 100 causes a greater fluid flow through the pressure outlet 100 and thereby an increased restoring pressure, while a lesser flow is seen at pressure outlet 96. A greater pressure differential is established between the two pressure outlets 96 and 100 which in turn causes a greater restoring force upon the shaft, while at the same time economically limiting the flow from the pressure outlet 96.

FIG. 4 illustrates a section of FIG. 3 with eight bleeder jets disposed equally around the periphery of the rotating shaft 40. Opposing bleeder jets of this set are operable in an analogous manner to that described for bleeder jets 48 and 49 of FIG. 3. Corresponding pressure outlets such as 96 and 100 would be provided. Hence, it is apparent that an increase in the bearing stiffness is provided where it is needed to dampen movements of the shaft. Since the shaft is rotating at relatively high r.p.m. and since there are time lags involved with the operation of the vortex amplifier, various timing schemes may be used for time lag compensation such as a predetermined angular displacement between the bleeder jets and the pressure outlets in the bushing. As indicated by the arrow in FIG. 4, the entire set of jets such as 48 and 49 may be rotatably adjustable, as by mounting in a rotatable collar (not shown) to provide the desired compensation for the shift in phase relationship between the sensing jets and the related pressure jets which occurs with changes in operating speed. Such an arrangement may, for example, have preset positions which are designed to provide optimum compensation for corresponding designated shaft speeds.

Additionally it should be noted that the bleeder jets may be located in closer proximity to the rotating shaft so as to increase the signal gain they provide. Finally it is apparent that since the system may not be needed above the critical speeds where instability occurs, various schemes may be developed to reduce the fluid flow through the system so as to conserve on fluid consumption. Thus, while the frequency response of arrangements as described is limited, its control becomes unnecessary in the range above its upper cutoff.

Figure 6:
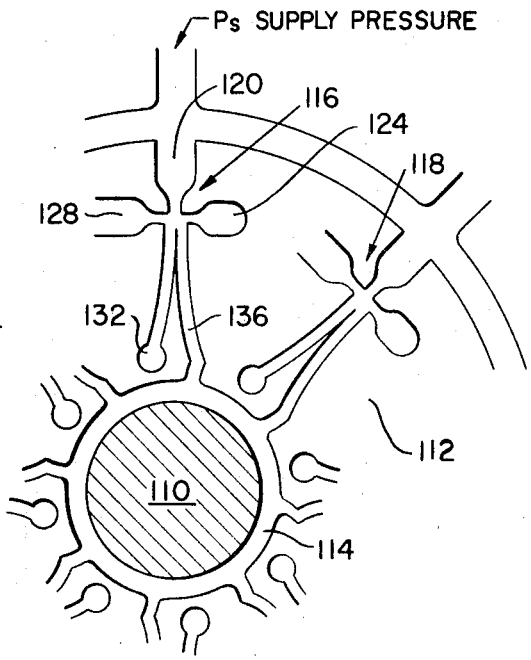
FIG. 6 is a partial view of a fluid amplifier which may be used as the fluidic controller in the invention as represented in FIG. 1.

FIG. 6 illustrates an alternative control element of the present invention and shows an operative portion of a journal type bearing having a rotatable shaft 110 within a stationary bushing 112 so that a spacing 114 is formed therebetween. The fluidic controller means comprises a series of radially spaced fluid amplifiers 116 and 118. Fluid amplifier 116 comprises a power inlet conduit 120, bias control inlet 124, trigger control inlet 128, return outlet conduit 132, and power outlet 136. Amplifier 118 is similarly constructed.

Operation of the fluid amplifier 116 is as follows: a power flow is applied to the power input conduit 120 and will attach itself automatically to either the output conduit 132 or output conduit 136 and remain attached until an effort is made to alter the condition. Attachment will depend upon which of the control conduits 124 and 128 has a greater flow. Thus, if an initial biasing flow exist from control input conduit 124, the power input flow will attach to the output conduit 132 where it may be channeled to a reservoir and returned to a compressor or pump acting as the pressure source (not shown). It conditions arise which cause a greater pressure or flow to exist in the control input conduit 128, then the power flow will be diverted from conduit 132 to the conduit 136. As seen, a flow through conduit 136 will supply fluid to the spacing 114 acting to restore the shaft 110 to its usual position as accomplished in the FIG. 3 embodiment.

Figure 8:
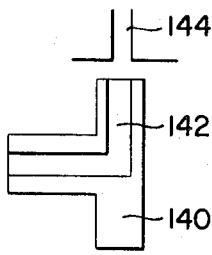
FIG. 8 is a section view along line 8—8 of FIG. 7.
Figure 7:
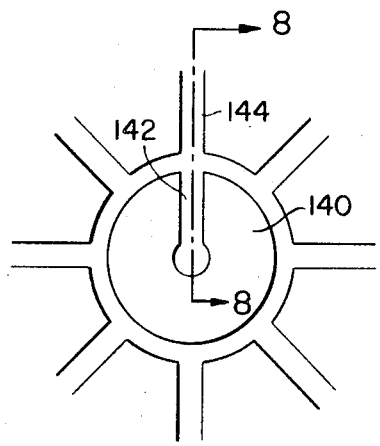
FIG. 7 is a diagrammatic section view of a fluid amplifier control trigger.

Referring now to FIGS. 7 and 8, there is illustrated a trigger or sensing device for developing the desired control flow. FIG. 7 illustrates a rotating shaft 140 (which may be the bearing shaft) having an internal conduit 142 connected to a pressure source (not shown) and adapted to align with a series of radially disposed conduits such as conduit 144 which in turn is connected to the control input conduit of a fluid amplifier such as conduit 128 (FIG. 6).

In operation, the shaft 140 rotates so as to intermittently align the conduit 142 with the various radial conduits. When alignment occurs, communication between the radial conduit and the pressure source is made directly causing an increased flow to be transmitted to a control input conduit such as conduit 128. This in turn increases the flow from conduit 128 to more than the biasing flow through conduit 124 which in turn causes the power stream from conduit 120 to be diverted from the conduit 132 to the conduit 136. Thus a localized higher pressure is developed to act as a restoring force upon the shaft. Once the conduit 142 moves out of alignment with the radial conduit 144, the pressure in the bias control inlet conduit 124 (FIG. 6) predominates and the power stream is diverted from conduit 136 back to conduit 132. As the shaft 140 continues to rotate so as to sequentially align the conduit 142 with the various radial conduits, each of the fluid amplifiers disposed about the periphery of the shaft 140 is in turn triggered through the resulting increase in the flow from the associated trigger conduit 128 to divert the power stream from the associated conduit 120 to the associated conduit 136. The sequential triggering of the various fluid amplifiers occurs even though the shaft remains centered relative to the bushing. While each fluid amplifier operates in on-off fashion and is triggered once each shaft revolution, as a practical matter the localized pressure increase between the shaft and the bushing which results from the triggering of each fluid amplifier is relatively small due to the residual pressure which remains from prior triggering.

Figure 9:
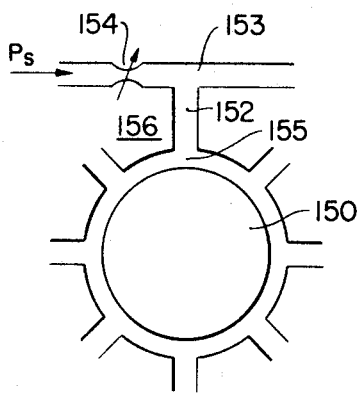
FIG. 9 is a diagrammatic section view of another preferred embodiment of a fluid amplifier control trigger.

In FIG. 9 there is shown another embodiment of a triggering or sensing device comprising a rotating shaft 150 (which may be the bearing shaft) with a series of radial conduits, such as conduit 152 which in turn communicates with a pressure source Ps via conduit 153 and variable orifice 154. Under usual running conditions, the flow from the pressure source (not shown) proceeds through conduit 152 and is spent in the spacing 155 between the shaft 150 and bushing 156. However, if the shaft 150 should move eccentrically toward one of the radial conduits, such as conduit 152, a higher pressure is developed in conduit 152 and the flow from the pressure source continues through conduit 153 which is connected to a control conduit, such as conduit 128 of FIG. 6, whereby the same effect is had upon the fluid amplifier 116 as was described above for the trigger embodiment shown in FIGS. 7 and 8. The other radial conduits, each of which is coupled to a different fluid amplifier, respond to the shaft 150 in similar fashion, the pressurized fluid from the associated pressure source being primarily directed through the radial conduit into the space between the shaft 150 and the bushing except when the shaft approaches the radial conduit so as to lie at less than the desired fixed distance therefrom.

Referring once again to FIG. 1, there is illustrated a warning device 20 which may be suitably connected to the sensing device 14 so as to indicate by any suitable method when a threshold pressure has been exceeded as sensed by the sensing device 14. Hence, the disclosed invention may be used as a safety device to indicate out-of-round conditions or a lack of lubrication when these conditions can be translated into increased pressures within the spacing between the rotating and the stationary elements of a bearing. Such a warning device 20 may be connected, for example, to the pressure conduit 74 of FIG. 3. It may be used to provide a continuous record, such as a graph, of pressure deviations (corresponding to shaft position deviations) which may provide an indication of impending failure—either of the bearing or some other portion of the rotating equipment affixed thereto. Alternatively it may be in the form of a device suitable for generating a visual or audible signal upon a shaft excursion (pressure deviation) in excess of a preset threshold representing a safe limit.

It is to be understood that various changes in form can be accomplished without departing from the scope and spirit of the disclosed invention. For example, the disclosed invention could be used in a fluid thrust bearing environment as well as the fluid journal type bearing as described below. Additionally, other fluidic devices may be used to provide the necessary restoring forces as needed.

In particular, arrangements of the present invention may be of particular importance as servo controlled liquid bearings for use under extreme operating conditions such as are encountered in modern aircraft jet engines. Such engines presently employ rolling steel structural bearings, but they are not entirely satisfactory and are subject to deterioration or failure with some frequency. The upper frequency cutoff of the servo control mechanisms employed in arrangements of the present invention is much higher when the pressurized fluid is a liquid than when a gas is employed. For the pressurized liquid bearings, the frequency cutoff of the servo mechanisms is well above the maximum operating speeds of aircraft jet engines in which the arrangements of the present invention may be used. For liquid bearings so employed, a separate fluid pressurizing source, such as an electric pump, is used to jack the bearing to the requisite shaft supporting position before shaft rotation is initiated. With that prerequisite, the arrangements in accordance with the invention would function in the manner described to control the stiffness of the bearing and other operating characteristics to provide the desired support of the engine shaft under all normal operating conditions. Such arrangements thereby overcome the deficiencies of presently known hydrostatic bearings which have heretofore kept such bearings from being adopted in jet engine use.

Although there have been described hereinabove specific arrangements of servo controlled fluid bearing arrangements in accordance with the invention for the purpose of illustrating the manner in which the invention may be used to advantage, it will be appreciated that the invention is not limited thereto. Accordingly, any and all modifications, variations or equivalent arrangements falling within the scope of the annexed claims should be considered to be a part of the invention.

I claim:

1. Apparatus for limiting the excursions of a bearing element comprising:
    a shaft rotatable with respect to a bushing encasing the shaft;
    means including a pressure source for supplying fluid under pressure to support the shaft within the bushing;
    at least one pressure bleed element positioned adjacent the shaft for providing a fluid flow having pressure variations corresponding to position variations of the shaft;
    a fluid controller connected between the pressure source and the bushing to control the supply of fluid to support the shaft, the fluid controller having a control conduit operative to control the flow of fluid through the controller; and
    variable throttling means connecting the pressure source to the pressure bleed element and to the control conduit of the fluid controller, the fluid flow from the pressure bleed element contacting the flow of fluid through the controller so as to selectively interfere therewith such that an excursion of the shaft toward the pressure bleed element causes an increase of pressure at the control conduit and a corresponding decrease in the supply of fluid at a point in the bushing to compensate for said excursion.

2. Apparatus in accordance with claim 1 further including:
    means for selectively varying the position of said at least one pressure bleed element to compensate for variations in the phase relationship between said element and the fluid supplying means.

3. A servo controlled fluid bearing comprising:
    first and second elements movable relative one to another and having a spacing therebetween for receiving fluid under pressure;
    a fluid controller communicating with said spacing and with a fluid source for altering the pressure of said fluid receivable in said spacing in response to a change in said spacing, said fluid controller including first conduit means for carrying a fluid flow; and
    sensing means communicating with the spacing and the fluid controller for selectively signaling the fluid controller in response to the relative position of the first and second elements, said sensing means including second conduit means for selectively carrying a fluid flow, and said first and second conduit means being disposed so that fluid flow from the second conduit means mixes with so as to selectively interfere with fluid flow from the first conduit means.

4. A servo controlled fluid bearing in accordance with claim 3, wherein the first and second elements comprise respectively a shaft positioned for rotation within an externally pressurized bushing.

5. A servo controlled fluid bearing in accordance with claim 4, wherein the sensing means includes a plurality of pressure elements positioned radially about and adjacent the shaft for reflecting a change of pressure to the fluid controller in response to a change of spacing relative to the shaft.

6. A servo controlled fluid bearing comprising:
    first and second elements movable relative one to another and having a spacing therebetween for receiving fluid under pressure;
    a fluid controller communicating with said spacing and with a fluid source for altering the pressure of said fluid receivable in said spacing in response to a change in said spacing; and
    sensing means communicating with the spacing and the fluid controller for selectively signaling the fluid controller at an output thereof in response to the relative position of the first and second elements;
    said fluid controller comprising a vortex amplifier having an annular chamber connected between an input conduit, and output opening, and a control conduit, the vortex amplifier being operative to control fluid flow from the input conduit to the output opening in response to pressure at the control conduit, and means connecting the input conduit to the fluid source, the output conduit to the spacing, and the control conduit to the output of the sensing means.

7. A servo controlled fluid bearing in accordance with claim 6, further including means coupled to the sensing means for indicating excursions of the first movable element relative to the second movable element.

8. A servo controlled fluid bearing in accordance with claim 7, wherein said indicating means includes a device for providing a warning in the event of a detected excursion of the first movable element in excess of a predetermined threshold.

9. A servo controlled fluid bearing arrangement comprising:
    a support element and an element to be supported;
    means for applying fluid under pressure to maintain a controlled spacing between the two elements; and
    means responsive to variations in position of one of said elements relative to the other for controlling the application of the pressurized fluid to compensate for said position variations including at least one fluid amplifier having first conduit means for carrying the pressurized fluid and second conduit means for selectively carrying a fluid flow determined by the variations in position, the first and second conduit means being disposed so that the fluid flow from the second conduit means comes into contact with the pressurized fluid in the first conduit means.

10. A servo controlled fluid bearing arrangement in accordance with claim 9, further including third conduit means providing an alternate path for the pressurized fluid in the first conduit means, the fluid flow from the second conduit means being operative to direct the pressurized fluid through the first conduit means when the pressure of the fluid flow at least equals a selected threshold value and alternately into the third conduit means when the pressure of the fluid flow is less than the selected threshold value.

11. A servo controlled fluid bearing arrangement in accordance with claim 10, further including fourth conduit means communicating with the first and third conduit means in the region of the second conduit means for providing a fluid flow having a pressure defining the selected threshold value.

12. The servo controlled fluid bearing in accordance with claim 10, wherein the support element comprises a bushing having a bore wall with which the second conduit means communicates, and the element to be supported comprises a shaft received within and rotatable relative to the bore wall of the bushing, the shaft having a radially directed opening therein and means for providing pressurized fluid to the radially directed opening, rotation of the shaft relative to the bore wall of the bushing periodically aligning the radially directed opening in the shaft with the second conduit means at the bore wall to introduce the pressurized fluid from the radially directed opening into the second conduit means and thereby raise the pressure of the fluid flow in the second conduit means to at least the selected threshold value.

13. A servo controlled fluid bearing arrangement in accordance with claim 10, wherein the support element comprises a bushing having a bore wall, the element to be supported comprises a shaft received within and rotatable relative to the bore wall of the bushing, and further including a source of pressurized fluid coupled to the second conduit means, and fourth conduit means coupling the second conduit means to the bore wall of the bushing.

References Cited

UNITED STATES PATENTS

| | | | |
|---|---|---|---|
| 2,578,713 | 12/1951 | Martellotti | 308—122 |
| 2,692,803 | 10/1954 | Gerard | 308—9 |
| 3,053,589 | 9/1962 | Cameron | 308—122 |
| 3,271,086 | 9/1966 | Deffrenne | 308—122 |
| 3,395,952 | 8/1968 | Deffrenne | 308—122 |

FOREIGN PATENTS

| | | | |
|---|---|---|---|
| 1,266,160 | 5/1961 | France | 308—122 |

FRED C. MATTERN, Jr., Primary Examiner

FRANK SUSKO, Assistant Examiner

PO-1050
(5/69)

UNITED STATES PATENT OFFICE
CERTIFICATE OF CORRECTION

Patent No. 3,560,064     Dated February 2, 1971

Inventor(s) Alexander Silver

It is certified that error appears in the above-identified patent and that said Letters Patent are hereby corrected as shown below:

Column 2, line 32, "bearings" should read --bearing--; l 54, after "space," and before "resulting" insert --a--. Col 6, line 34, "circuit 86" should read --conduit 86--. Column line 32, "exist" should read --exits--; line 36, "It" should read --If--; line 55, after "directly" insert a comma (--,--

Signed and sealed this 21st day of September 1971.

(SEAL)
Attest:

EDWARD M. FLETCHER, JR.
Attesting Officer

ROBERT GOTTSCHALK
Acting Commissioner of Pater